United States Patent
Bellows et al.

(10) Patent No.: US 11,262,431 B2
(45) Date of Patent: Mar. 1, 2022

(54) CO-LOCATED LOCATIONING TECHNOLOGIES

(71) Applicant: SYMBOL TECHNOLOGIES, LLC, Lincolnshire, IL (US)

(72) Inventors: David Bellows, Old Westbury, NY (US); Rehan K. Jaffri, New York, NY (US); Sean D. Marvel, Hampton Bays, NY (US)

(73) Assignee: Symbol Technologies, LLC, Holtsville, NY (US)

(*) Notice: Subject to any disclaimer, the term of this patent is extended or adjusted under 35 U.S.C. 154(b) by 425 days.

(21) Appl. No.: 16/282,035

(22) Filed: Feb. 21, 2019

(65) Prior Publication Data

US 2019/0187238 A1 Jun. 20, 2019

Related U.S. Application Data

(63) Continuation of application No. 14/492,110, filed on Sep. 22, 2014, now Pat. No. 10,261,167.

(51) Int. Cl.
*G01S 1/72* (2006.01)
*G01S 5/02* (2010.01)
(Continued)

(52) U.S. Cl.
CPC ............ *G01S 5/0257* (2013.01); *G01S 5/18* (2013.01); *G06K 7/10366* (2013.01);
(Continued)

(58) Field of Classification Search
None
See application file for complete search history.

(56) References Cited

U.S. PATENT DOCUMENTS 2,428,793 A 10/1947 Fay
2,559,045 A 7/1951 Petel
(Continued)

FOREIGN PATENT DOCUMENTS

EP 1271793 A2 1/2003
EP 1379101 A1 1/2004
(Continued)

OTHER PUBLICATIONS

Office Action for Canadian Patent Application No. 2959176 dated Dec. 6, 2017.
(Continued)

*Primary Examiner* — Isam A Alsomiri
*Assistant Examiner* — Jonathan D Armstrong
(74) *Attorney, Agent, or Firm* — Yuri Astvatsaturov

(57) ABSTRACT

A method and apparatus for a co-located Radio Frequency Identification (RFID) device and ultrasonic device includes an RFID reader loop antenna element oriented parallel to a reflector panel. An ultrasonic emitter is disposed through an aperture in the reflector panel with a horn that extends through the loop element. The horn can serve as a mounting structure for the antenna element. A diameter of the aperture is less than one-quarter wavelength of an operating frequency of the RFID reader loop antenna element. The aperture is located in the reflector panel near a minimum E-field area of the RFID reader loop antenna element.

14 Claims, 8 Drawing Sheets

(51) Int. Cl.
*H04R 1/30* (2006.01)
*G01S 5/18* (2006.01)
*G06K 7/10* (2006.01)
*H01Q 1/22* (2006.01)
*H01Q 5/22* (2015.01)
*H01Q 1/00* (2006.01)
*H01Q 7/00* (2006.01)
*H01Q 21/20* (2006.01)

(52) U.S. Cl.
CPC ....... *G06K 7/10405* (2013.01); *H01Q 1/2216* (2013.01); *H01Q 5/22* (2015.01); *H04R 1/30* (2013.01); *H01Q 1/007* (2013.01); *H01Q 7/00* (2013.01); *H01Q 21/205* (2013.01)

(56) References Cited

U.S. PATENT DOCUMENTS

| | | |
|---|---|---|
| 2,581,967 A | 1/1952 | Mitchell |
| 2,642,948 A | 6/1953 | Olson et al. |
| 3,194,339 A | 7/1965 | Pawlowski |
| 3,396,366 A | 8/1968 | Midlock et al. |
| 3,842,203 A | 10/1974 | Weisberg |
| 3,852,529 A | 12/1974 | Schafft |
| 4,164,631 A | 8/1979 | Garner et al. |
| 4,260,928 A | 4/1981 | Salem |
| 4,385,211 A | 5/1983 | Shintaku |
| 4,673,057 A | 6/1987 | Glassco |
| 5,371,509 A | 12/1994 | Wallace, Jr. et al. |
| 5,802,196 A | 9/1998 | Nakamura |
| 6,201,508 B1 | 3/2001 | Metzen et al. |
| 6,502,662 B1 | 1/2003 | Nakamura et al. |
| 6,642,905 B2 | 11/2003 | Bien et al. |
| 6,778,813 B1 | 8/2004 | Lilly |
| 6,950,530 B2 | 9/2005 | Baird et al. |
| 7,167,130 B2 | 1/2007 | Hayes |
| 7,729,721 B2 | 6/2010 | Kim |
| 8,406,825 B2 | 3/2013 | Huang et al. |
| 8,558,715 B2 | 10/2013 | Lien et al. |
| 8,660,612 B2 | 2/2014 | Zhu et al. |
| 9,584,924 B2 | 2/2017 | Akino |
| 2002/0024468 A1 | 2/2002 | Palmer et al. |
| 2004/0252857 A1 | 12/2004 | Lewis |
| 2007/0066274 A1 | 3/2007 | Kim |
| 2009/0005110 A1 | 1/2009 | Ozden |
| 2009/0114554 A1 | 5/2009 | Earnest |
| 2010/0158291 A1 | 6/2010 | Polinske et al. |
| 2011/0018774 A1 | 1/2011 | Kikin |
| 2011/0304508 A1 | 12/2011 | Remez et al. |
| 2012/0114163 A1 | 5/2012 | Yang et al. |
| 2013/0170690 A1 | 7/2013 | Backman |
| 2014/0029782 A1 | 1/2014 | Rayner |
| 2014/0062825 A1 | 3/2014 | Hansen |
| 2014/0062826 A1 | 3/2014 | Jonsson et al. |
| 2014/0105426 A1 | 4/2014 | Fincham |
| 2014/0197531 A1 | 7/2014 | Bolognia |
| 2014/0232612 A1 | 8/2014 | Jenwatanvet |
| 2014/0233751 A1 | 8/2014 | Cataldo et al. |
| 2014/0266962 A1 | 9/2014 | Dupuy et al. |
| 2016/0286169 A1 | 9/2016 | Sannala |

FOREIGN PATENT DOCUMENTS

| | | | |
|---|---|---|---|
| EP | 1489681 A1 | 12/2004 | |
| EP | 2226895 A2 * | 9/2010 | ............. H01Q 21/24 |
| GB | 2480388 A | 11/2011 | |
| JP | 58143632 A | 8/1983 | |
| JP | H067323 A * | 6/1992 | |
| JP | 2007244580 A * | 9/2007 | |
| KR | 100799583 B1 | 1/2008 | |
| RU | 2168818 C1 * | 6/2001 | |
| WO | 2003003506 A1 | 1/2003 | |
| WO | WO-03077507 A1 * | 9/2003 | ............. H04M 1/03 |
| WO | 2009069998 A1 | 6/2009 | |
| WO | 2014031303 A1 | 2/2014 | |

OTHER PUBLICATIONS

International Preliminary Report on Patentability for corresponding International Patent Application No. PCT/US2015/050416 dated Dec. 14, 2015.
Dean Straw, Chapter 5 Loop Antennas—The ARRL Antenna Book CD 1.0, Nov. 18, 1998, pp. 5-1 to 5-2.
Examination Report for Great Britain Patent Application No. 1704503.0 dated Sep. 23, 2020.

* cited by examiner

CO-LOCATED LOCATIONING TECHNOLOGIES

CROSS-REFERENCE TO RELATED APPLICATION

This application is a continuation of U.S. patent application Ser. No. 14/492,110, filed on Sep. 22, 2014, and incorporated herein by reference in its entirety.

BACKGROUND

The use of locationing technology is expanding in local area environments, such as a retail environment, a factory environment, a warehouse environment, etc. In addition, there are a variety of different locationing technologies available (e.g. Radio Frequency Identification (RFID), ultrasonic signals, RF signals, video, etc.) that can be used for different purposes. These different purposes can result in the need for incorporating combinations of these different locationing technologies within the same environment. However, some of these locationing technologies can be bulky, and providing independent installation of each locationing technology could end up duplicating other systems, such as supplying separate network communication infrastructure for each locationing technology.

As a result, in a commercial environment there may be several different locationing technologies being used, each using their own network communication infrastructure. For example, in a Radio Frequency Identification (RFID) application, fixed RFID readers may be mounted overhead (e.g., ceiling mounted) in several positions and orientations throughout the environment, in order to read and locate any RFID tag within the environment. Also, in an ultrasonic locationing system, fixed ultrasonic emitters may be mounted overhead (e.g., ceiling mounted) in several positions throughout the environment, in order to locate and track any mobile device within the environment. These overhead configurations offer several advantages such as fewer physical signal obstructions, ease of access to wiring in a ceiling, tamper resistance, safety, and the like. Each of these applications can require multiple antennas/emitters and circuitry housings disposed throughout the environment. Therefore, it can be desirable to combine the network infrastructure for different locationing systems into a common housing or into other available housings such as video cameras, etc. However, such combinations have disadvantages.

For example, combining different locationing systems into a common housing will increase the size of the housing, making installation more difficult and appearing more obtrusive. In particular, in order to get full 360 degree coverage, an RFID locationing device can use eight RFID antennas distributed outwardly every 45 degrees around a circle. Whereas an ultrasonic locationing system can use four ultrasonic emitters, positioned and oriented every 90 degrees around a circle. Because an oversized combined product is obviously undesirable, a compact mechanical package combining these two technologies is desirable, and any opportunity to combine the two in a shared space would be of benefit.

Accordingly, there is a need for a technique to physically combine different locationing technologies that overcome the aforementioned limitations.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
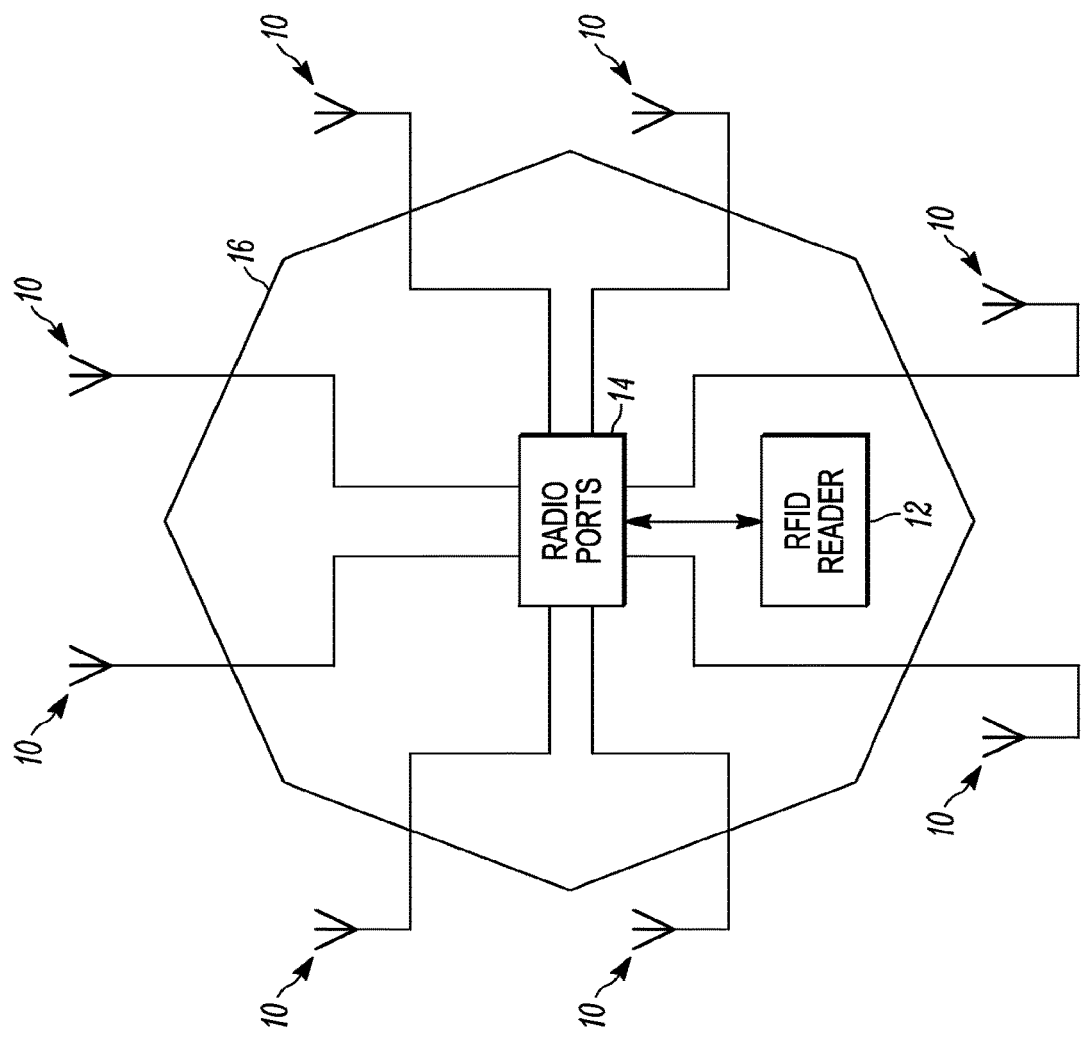
FIG. 1 is a simplified block diagram of an RFID reader and antenna configuration, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, the present invention provides a technique for combining and co-locating different locationing technologies into a common housing without a significant increase in overall size. The present invention provides an overhead combination of different locationing technologies in a small and lightweight arrangement, where the physical size of the combination arrangement is kept to a minimum so that the system is unobtrusive, easy to assemble, easy to install, integrate, and maintain, and can allow for other features, such as a security camera, wireless communication, etc.

For example, each of the locationing technologies can communicate with a remote server using a shared, common wireless communication system (not shown). It should be recognized that the present invention can be applied using one or more wireless communication technologies such as, but are not limited to: RF; IrDA (infrared); Bluetooth; ZigBee (and other variants of the IEEE 802.15 protocol); IEEE 802.11 (any variation); other RFID frequency bands, such as HF and LF; IEEE 802.16 (WiMAX or any other variation); Universal Mobile Telecommunications System (UMTS); Code Division Multiple Access (CDMA) including all variants; Global System for Mobile Communications (GSM) and all variants; Time division multiple access (TDMA) and all variants; Direct Sequence Spread Spectrum; Frequency Hopping Spread Spectrum; wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

In general, the RFID reader is configured to provide communication between the RFID reader and nearby RFID tags. For example, the RFID reader "interrogates" RFID tags, and receives signals back from the tags in response to the interrogation. The reader is sometimes termed as "reader interrogator" or simply "interrogator." In an exemplary embodiment, the RFID reader may include, without limitation one or more of: a processor, a communication module, memory, and at least one antenna. The elements of the RFID reader may be interconnected together using a communication bus or another suitable interconnection arrangement that facilitates communication between the various elements of the RFID reader.

The ultrasonic locationing technology is configured to provide time signals between an ultrasonic emitter and a mobile device. For example, the mobile device can receive ultrasonic signals from different emitters, measure the timing of each of these signals, and use triangulation or other techniques to establish its position within the environment. In an exemplary embodiment, the ultrasonic locationing technology may also include, without limitation one or more of: a processor, a controller, a communication module, memory, and a plurality of ultrasonic emitters.

Both of the RFID reader and ultrasonic controller can share the same communication module, which can include components enabling communication on a wired or wireless network. For example, the communication module may include a wired Ethernet interface or wireless access point to communicate information about RFID tags and ultrasonic signaling on a local area network to a central server. It should be appreciated that the description herein portrays the communications with a central server in an oversimplified manner, and a practical embodiment can include additional components and suitably configured processing logic to support known or conventional operating features that are not described in detail herein for the sake of brevity.

A processor may be any microprocessor, application specific integrated circuit, field programmable gate array, digital signal processor, any suitable programmable logic device, discrete gate or transistor logic, discrete hardware components, or combinations thereof that has the computing power capable of managing the RFID reader or ultrasonic emitters. Processors generally provide the software, firmware, processing logic, and/or other components of the RFID reader or ultrasonic emitters that enable their functionality.

A memory can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory can incorporate electronic, magnetic, optical, and/or other types of storage media. Note that the memory can have a distributed architecture, where various components are situated remotely from one another, but can be accessed by the processor. The memory may be utilized to store data associated with RFID interrogations, ultrasonic signaling, etc.

A housing combining different network infrastructure can further include electronics and components for operation of the antenna arrangement of the RFID reader and for operation of the ultrasonic emitters. The electronics, components, etc. of the combined network infrastructure may be disposed or located within the housing. For example, the housing may enclose electronics and the like for operation of the RFID reader, ultrasonic emitters, wireless access point, as well as other components as described herein. The housing can be defined by a common conductive enclosure that shields internal components from external electrical signals while providing insulated feedthroughs, apertures, or vias to provide radio and ultrasonic signals outside of the housing, such as to antenna elements, wired connections, and emitters. For example, the electronics and components may include electrical connectivity to the antenna feeds through the housing for transmission and reception of RFID signals and connection to ultrasonic drivers for transmission of ultrasonic signals.

FIG. 1 illustrates a block diagram of an antenna configuration of one RFID embodiment of the present invention. An RFID reader 12 can be connected to a plurality of antenna elements 10 via an antenna switch or different radio ports 14 of the RFID reader. Also, the RFID reader can direct the different radio ports to sequentially communicatively connect only one antenna element at a time to the RFID reader such that only one antenna element is operable to transmit/receive at any instant in time. The RFID reader can provide any received tag information it obtains to an access point that can be wired or wirelessly connected to a local area network (not shown) for inventory purposes, for example. Although eight antenna elements are shown, there could be any number of elements. Preferably, there is an even number of antenna elements arranged in a circle to radiate outwardly from the circle. As shown in this embodiment, there are eight antenna elements evenly disposed at 45 degree intervals of the circle and connected to an eight-port radio.

Figure 2:
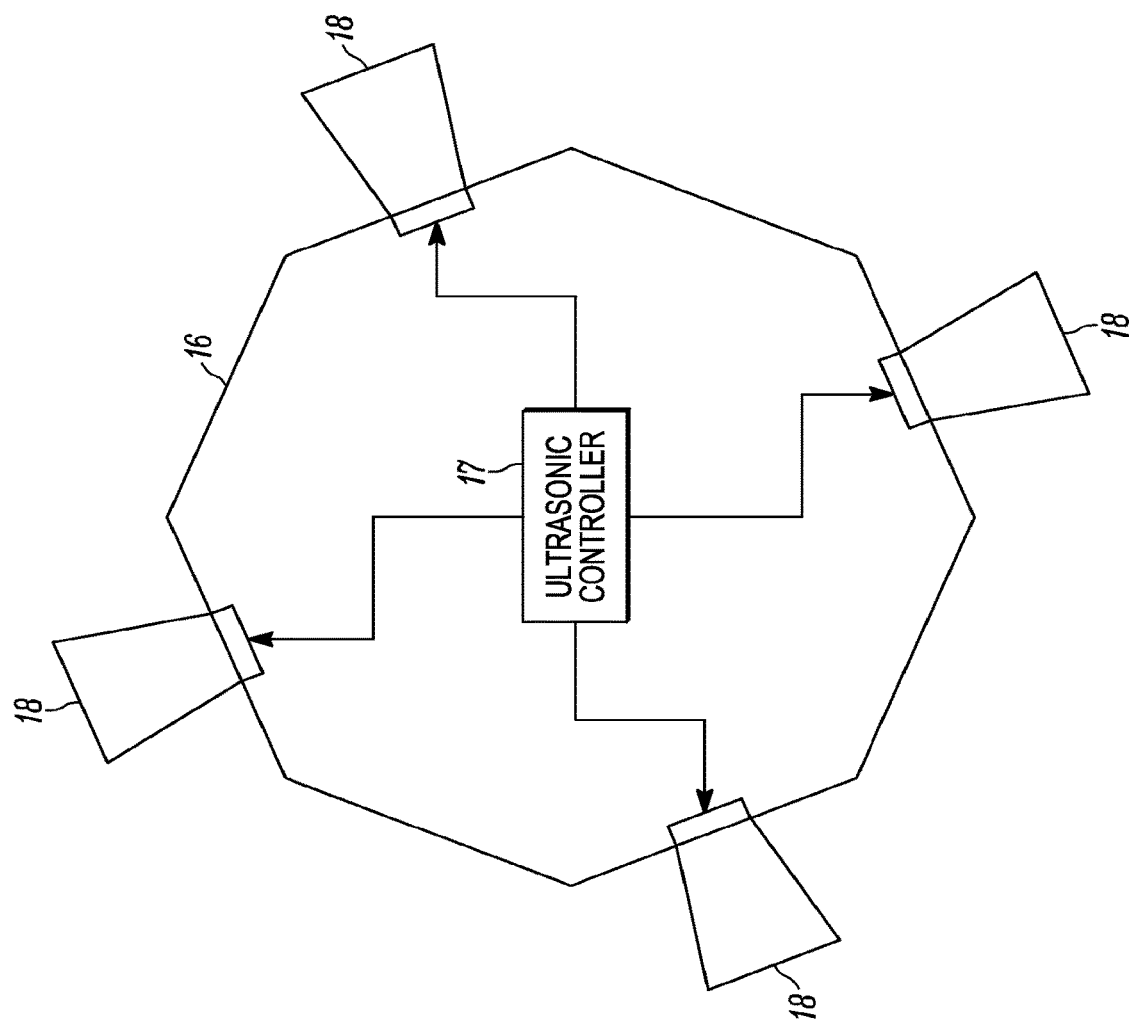
FIG. 2 is a simplified block diagram of an ultrasonic emitter configuration, in accordance with some embodiments of the present invention.

FIG. 2 shows a block diagram of another embodiment of the present invention including an ultrasonic locationing configuration of ultrasonic emitters 18. The driver of each emitter is controlled by a central ultrasonic controller 17 that can receive instructions for driving each emitter from a remote server. These instructions can include timing and sound pressure levels for the ultrasonic signals. The controller may share circuitry with the RFID reader. The emitters 18 are co-located with the RFID antenna elements 10 of FIG. 1, as will be described below. Although a combined embodiment as described herein has eight RFID antennas (of FIG. 1) and four ultrasonic emitters (of FIG. 2), the actual number of each of the RFID antennas and ultrasonic emitters can vary, depending on the need, application, or coverage. For example, there can be one ultrasonic emitter co-located with every RFID antenna, e.g. eight of each.

Figure 3:
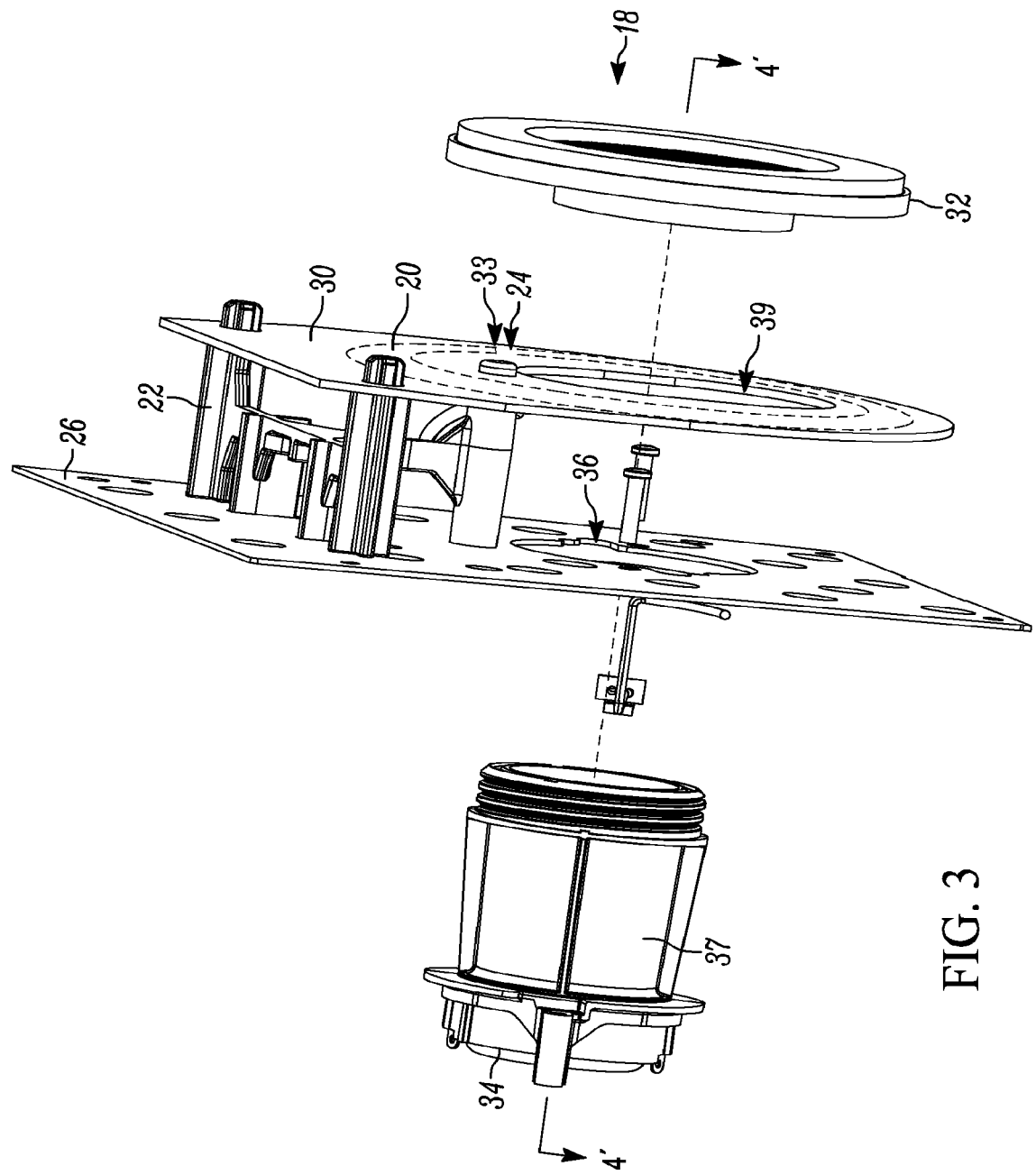
FIG. 3 is a perspective view of an assembly of one co-located RFID antenna and ultrasonic emitter combination for the devices of FIGS. 1 and 2.
Figure 4:
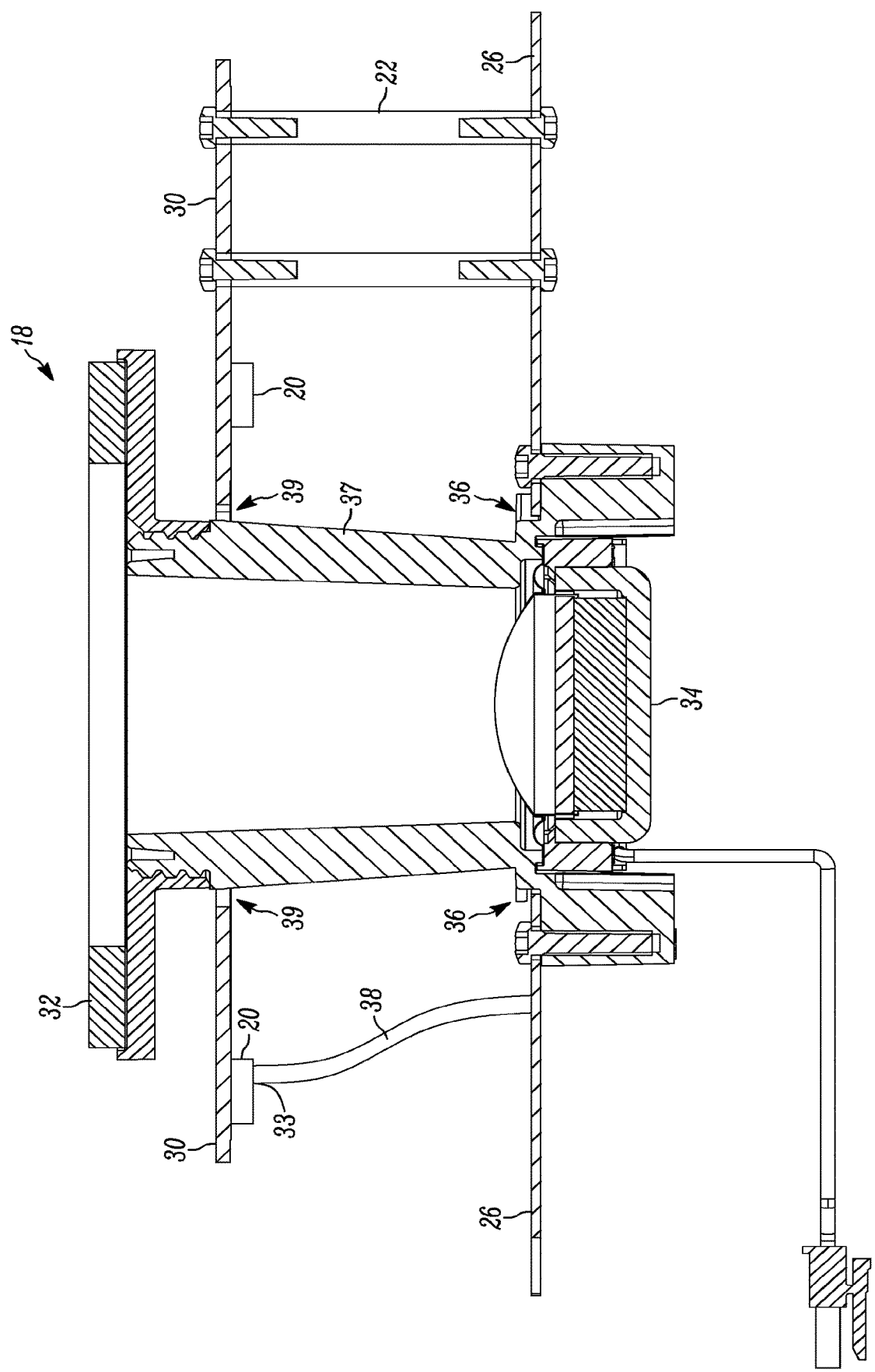
FIG. 4 is a cut-away view of the embodiment of FIG. 3.

Referring to FIG. 3 (exploded emitter view) and FIG. 4 (assembled emitter cutaway view), in one embodiment an RFID antenna includes a linearly polarized, full wavelength loop 20 as the driven element that is oriented substantially parallel to a conductive reflector panel 26. The loop element 20 can be disposed on a printed circuit board 30 for easy mounting to the reflector panel using standoffs 22. As is known in the art, the loop element can be fed by an RF signal at a specific feed point 33, depending on the linear polarization desired. In this example, with the gap 24 positioned as shown, and with the element being fed near the gap, a vertical polarization can be achieved. With the gap and feed point rotated 90 degrees, a horizontal polarization can be achieved. Those skilled in the art will recognize that the loop geometry can be different than what is shown in this exemplary embodiment—as examples, the size can be larger or smaller, the shape does not have to be a circle, the width of the loop does not need to be constant, etc. The loop element 20 is driven by a balun cable 38 connected at the feed point 33 and grounded to the reflector 26 (as shown in FIG. 4). The balun cable in this embodiment is one-quarter wavelength long at the operating frequency. For example, for the North American RFID band, which operates between 902 MHz and 928 MHz, the balun cable length is 8.16 cm.

A two-piece ultrasonic emitter 18 is provided. An audio waveguide or horn 37 with a compression driver (speaker) 34 is mounted to the RFID reflector panel 26 such that the driver 34 is positioned substantially behind the reflector. A speaker flange 32 completes the emitter 18. The assembled ultrasonic emitter is disposed through an aperture 36 in the reflector panel 26, with the horn 32 extending from the driver 34 through the loop element 20 and extending past the loop element 20. In this way, the emitter and RFID antenna are co-located. The aperture, emitter, and loop element may or may not be co-located co-axially. In other words, the emitter may be off axis from the center of the loop element, as shown. In addition, the emitter need not be aligned exactly perpendicular to the plane of the loop element. In any event, the driver and horn constitute a two piece assembly, wherein the driver is mounted to the reflector panel, and the driver and horn are configured to be assembled together through the loop antenna element and the aperture.

In accordance with the present invention, the aperture is cut in the reflector to allow the ultrasonic energy to pass through the reflector. A diameter of the aperture is less than one-quarter wavelength of an operating frequency of the RFID reader loop antenna element. Therefore, having the compression driver smaller in diameter than a quarter RFID wavelength mitigates the RFID signal passing through the aperture, i.e. the aperture is invisible to the RFID antenna. In addition, the aperture is located in the reflector panel near a minimum E-field area of the RFID reader loop antenna element, in order to further mitigate RFID signals passing through the aperture. For example, where a loop element is fed at a feed point 33 near the gap 24, the antenna presents little to no E-field near the aperture. Therefore, adding a small component, such as a speaker driver 34, at the reflector panel near a centerline of the loop does not adversely affect the loop antenna's performance. Accordingly, since the ultrasonic emitter is positioned in the low E-field region of the loop antenna, RFID functionality is not affected.

The reflector panel 26 may have holes cut out to provide electrical connections therethrough. Furthermore, the geometric details of the loop and reflector panel may be different for differing antenna polarizations. It should also be recognized that a partial circle antenna configuration can be used successfully in the present invention, other than the full circle embodiment shown, to provide a substantially linear polarization. Typically, the physical shape, size, and configuration of the antenna geometry should be resonant at 915 MHz, which is a standard frequency for RFID applications. For European RFID applications, the physical shape, size, and configuration of the antenna geometry should be resonant at 865 MHz.

In the 915 MHz example shown in FIGS. 3 and 4, each loop element can be flat and approximately 10 centimeters in diameter. The distance of the loop element from the reflector panel is approximately 3.175 centimeters. Note that there are other combinations of spacing, loop element diameter, and reflector panel size that result in a properly tuned and matched 915 MHz system. Also, the loop element does not need to be flat. For example, it may be contoured to follow a curved shape of a conical reflector. In addition, although a circularly polarized antenna could be used, circularly polarized antennas need an additional 3 dB of circular gain to match the gain of their linear polarized equivalents, which would result in a significantly larger antenna arrangement and housing.

It should be noted that the size values are approximate, and they could all be varied to affect a different antenna gain, frequency match, or radiation pattern. The use of a reflector panel placed behind the loop element and having a spacing therebetween helps to reflect back most of the RF energy, making the antenna element a high gain antenna system. The reflector panel takes energy that is directed backwards, towards it from the loop element and redirects it, combining it with the directly radiated pattern that was already directed forward. The result is a high gain, directional antenna.

Figure 8:
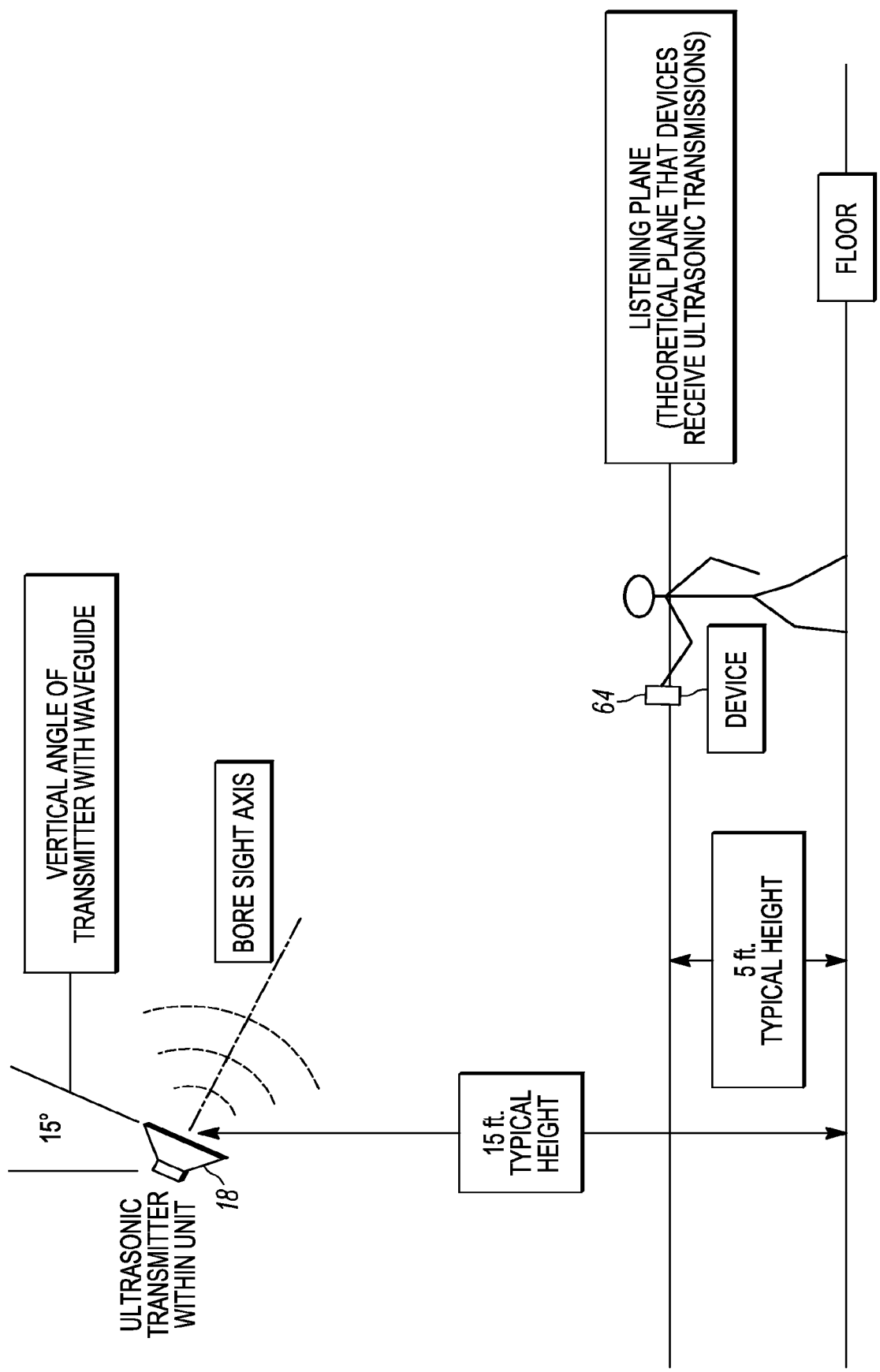
FIG. 8 shows a mobile device and a theoretical listening plane in accordance with some embodiments of the present invention.

A length of the ultrasonic emitter horn extending from the reflector panel is approximately 4.5 centimeters. As shown, it is envisioned that the ultrasonic emitter is a two-piece design. A compression driver 34 having an externally threaded tweeter cup with an audio waveguide or horn 37 can assemble to the reflector panel 26. This assembly extends through a hole in the loop antenna 20 printed circuit board 30 and the aperture 36. An internally threaded speaker flange 32 screws to the tweeter cup with horn 37 to complete the assembly of the emitter. The speaker flange 32 serves as a baffle as well as a protective cover for compression driver 34. It should be recognized that these two parts could be attached is several other ways including snap connectors, twist locks, screws, etc. It should also be recognized that the tweeter cup with horn 37 and speaker flange 32 can be split differently with the end combined result being the same or very similar. It should also be recognized that a separate embodiment can have custom shaped waveguides for specific environments as required for performance. In this way, the waveguide provides an optimized energy spread out onto a "listening plane" of the environment where mobile devices can pick up a specific ultrasonic frequency signal of the emitters (as shown in FIG. 8 which shows a mobile device and a theoretical listening plane for which a mobile device would receive transmission from the ultrasonic emitters. This figure also shows the orientation (vertical angular offset) for the ultrasonic emitters in this embodiment).

In this way, the present invention provides the advantage that the RFID loop antenna and ultrasonic emitter can be co-located without taking up any more spatial volume of an enclosure of the housing, which frees up critical spatial volume for other features, such as a video camera and the like.

In the configuration shown in FIG. 3 the loop element 20 and reflector panel 26 are spaced from each other using insulating spacers or standoffs 22 therebetween. However, it is envisioned that the loop element need not be mechanically coupled directly to the reflector panel, but instead can be mechanically coupled directly to the ultrasonic emitter 18, which is in turn mechanically coupled to the reflector panel 26. Using the ultrasonic emitter as the mounting structure for the loop element eliminates the need for a separate mounting structure, thereby reducing the number of parts, lowering cost, and simplifying the design.

Figure 5:
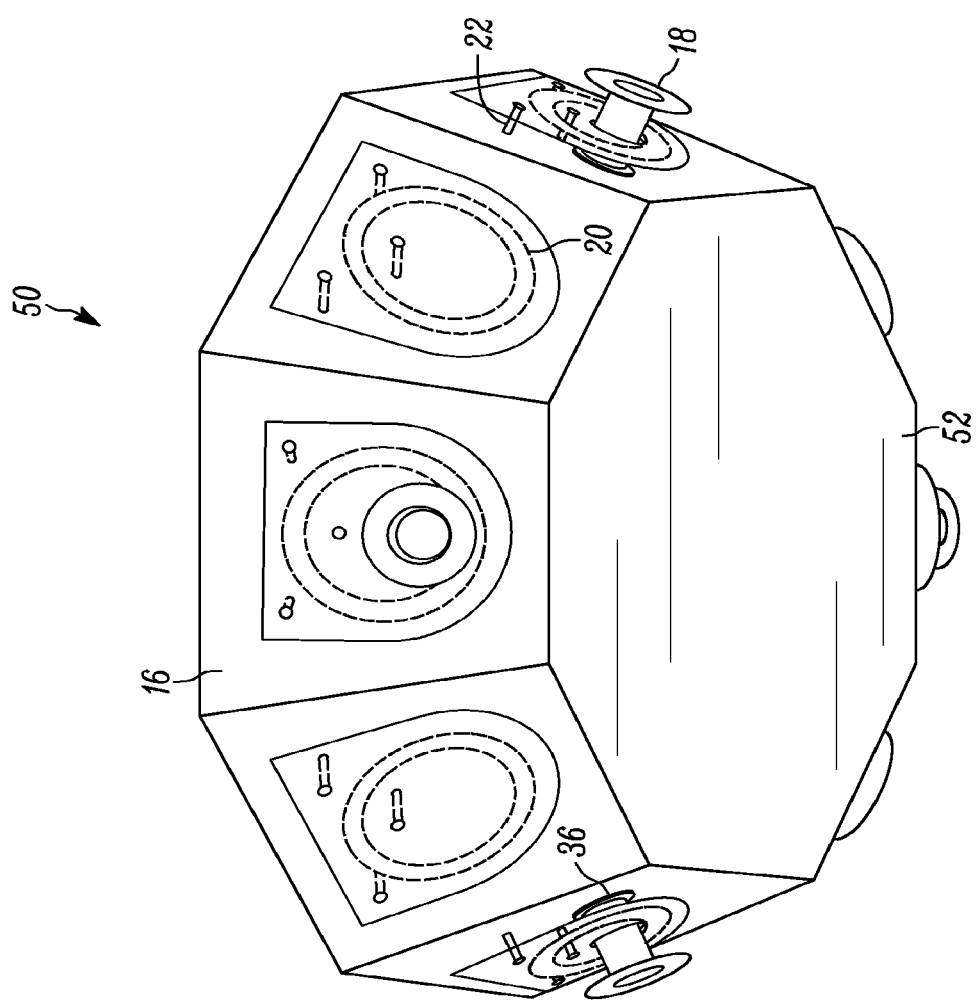
FIG. 5 is a perspective view of a housing including the co-located RFID antennas and ultrasonic emitters of FIGS. 1 and 2.

FIG. 5 shows a perspective view of an eight element RFID antenna configuration with four co-located ultrasonic emitters 18, in accordance with some embodiments of the present invention. This embodiment utilizes a plurality of the reflector-backed RFID linearly polarized loop antennas 20 (such as those represented in FIG. 3) arranged in a circle (eight antennas spaced at 45 degree intervals) to achieve 360 degrees of coverage. Some of the loop antennas include a co-located ultrasonic emitter to form the arrangement of FIG. 3. In one embodiment, all (eight) antenna configurations include an ultrasonic emitter. In another embodiment, half of the antenna configurations include an ultrasonic emitter (as shown). It should be recognized that any number of ultrasonic emitter and/or RFID antennas could be used. The reflector panels, emitters, and antennas are angled approximately fifteen degrees from the vertical.

All the reflector panels 26 are electrically joined together, along with a conductive top 50 and bottom 52, to define a common reflector box or housing 16. The reflector box isolates the radiated RF energy of the antenna elements from the ultrasonic emitter circuitry. The central housing 16 can be, but is not limited to, a square, rectangular, trapezoidal, or a conic section. For example, the central housing 16 can have a faceted embodiment described by a trapezoidal pyramidal section with planar reflector panels (as shown) that acts as one common reflector panel and ground plane for all the antennas as well as an electrical ground for enclosing the other electronics located inside the housing, including drive circuitry for both the RFID reader loop antenna elements and ultrasonic emitters. Alternatively, the central housing can be a continuous truncated conical surface. In this embodiment, the antenna arrangements may be built as individual modules that are then mechanically assembled to a central housing or frame with the top 50 and bottom 52. The configuration shown, when fully enclosed, results in an overall maximum dimension of about 48 centimeters wide and about 18 centimeters tall with the housing portion 16 having a maximum dimension of about 38 centimeters wide.

In the configuration shown in FIG. 5, numerous RF simulations were run and physical RF mockups of the system were built, and the testing validates the concepts associated with the antenna arrangement of the present invention. This configuration provides the ability to read all RFID tags near the RFID reader while providing unobstructed ultrasonic locationing. The RFID reader and ultrasonic controller can be wirelessly controlled using existing WLAN infrastructure.

Figure 6:
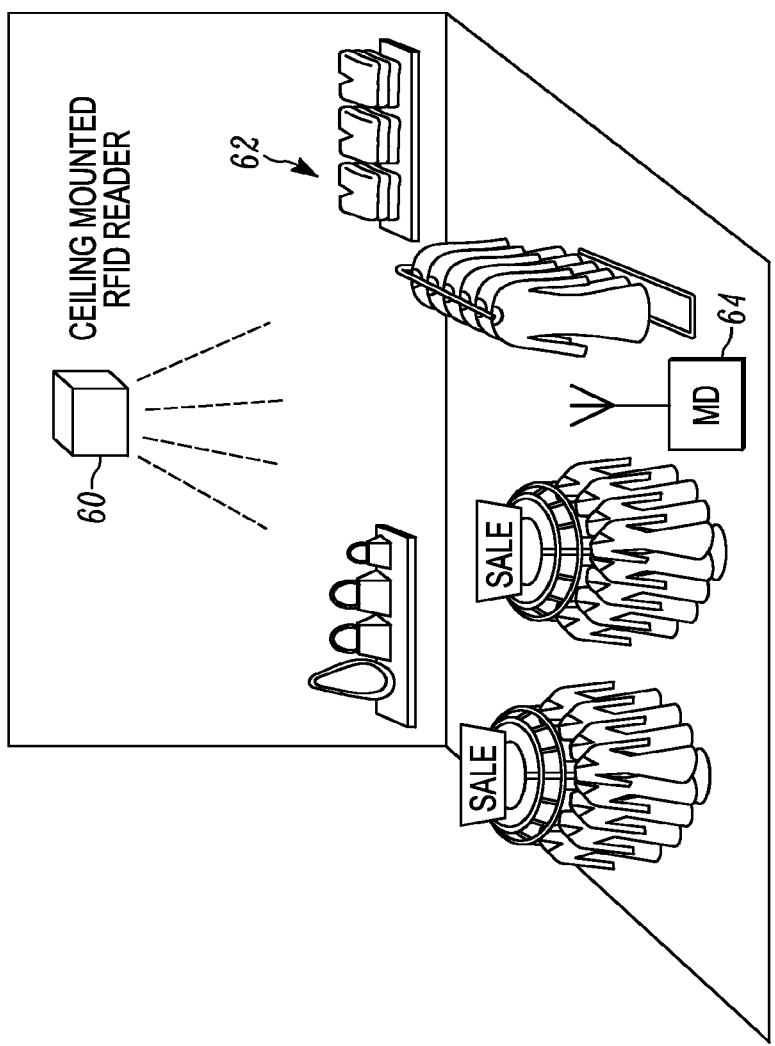
FIG. 6 is a perspective view of an example environment utilizing the antenna arrangement of FIG. 5.

FIG. 6 is a perspective diagram of an exemplary retail environment with an RFID reader/ultrasonic system housing enclosure 60 of FIG. 5 in a ceiling-mounted overhead configuration. The present invention is configured to provide wireless interrogation of a plurality of RFID tags located on or affixed to a plurality of items 62, while also providing ultrasonic locationing of mobile devices 64. The housing enclosure 60 may be mounted to a ceiling or other overhead fixture in the retail environment. The retail environment is shown solely for illustration purposes, and the antenna arrangement of the present invention may be used in any environment including a warehouse, manufacturing facility, file room, storage area, and the like. The antennas of the RFID reader are configured to provide a far field radiation pattern covering the floor of the environment, while the ultrasonic emitters are configured to provide a substantially uniform listening plane for mobile device moving within the environment. Typically, the housing is mounted on a ceiling of the environment, approximately fifteen feet above the floor. The antennas and emitters are angled downwardly, approximately fifteen degrees from vertical (as represented in FIGS. 5 and 8). In this way, the emitters can communicate with a mobile device 64 that is being carried by a person at a typical carrying height defined herein as a listening plane, which is a theoretical plane above the floor where carried devices can receive ultrasonic transmission.

Figure 7:
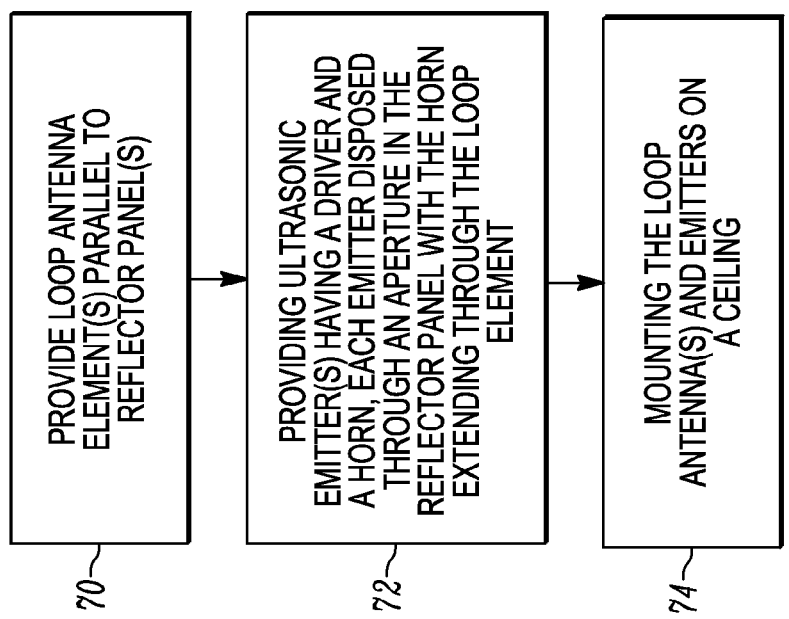
FIG. 7 shows a flowchart of a method in accordance with some embodiments of the present invention.

Referring to FIG. 7, the present invention describes a method for co-locating a Radio Frequency Identification (RFID) device and ultrasonic device. A first step 70 includes providing at least one RFID reader loop antenna element oriented parallel to a reflector panel.

A next step 72 includes providing at least one ultrasonic emitter including a driver and a horn, wherein each ultrasonic emitter is disposed through an aperture in the reflector panel with the horn extending through the loop element. A diameter of the aperture is less than one-quarter wavelength of an operating frequency of the RFID reader loop antenna element. The aperture is located in the reflector panel near a minimum E-field area of the RFID reader loop antenna. The driver and horn constitute a two piece assembly, wherein the driver and horn are configured to be assembled together through the loop antenna element and the aperture element. A length of the horn from the reflector panel is approximately 4.5 centimeters and a distance of the loop element from the reflector panel is approximately 3.175 centimeters.

A next step 74 includes mounting the antenna element and emitter on a ceiling of an environment, with the ultrasonic emitter angled approximately fifteen degrees downwardly from the vertical.

Advantageously, the present invention provides an integration technique that allows two locationing technologies to occupy the same space, thereby providing a significant competitive advantage. By mounting the source of the ultrasonic energy to the back of the RFID reflector plate and passing the energy through a convenient geometric opening and low E-field area of the RFID driven element, isolation between the two systems is very high resulting in each system being invisible to the other. Note that both the length of the waveguide and the spacing between the antenna driven element and reflector are optimized such that the two technologies can coexist in a shared dimension. As a result, the present invention allows co-location of both locationing systems as well as a means to secure and assemble both systems' components within as minimal of a space as feasible for the required performance (RFID antenna gains as well as proper speaker size for sufficient Sound Pressure Level, polar sound energy pattern, and radial symmetry of sound energy about the bore sight axis for the emitter).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus including a co-located Radio Frequency Identification (RFID) device and ultrasonic device, comprising:
    an RFID reader loop antenna element disposed away from a reflector panel, the reflector panel configured to redirect at least some radio frequency energy generated by the loop antenna element in a predetermined direction, the loop antenna element overlaying the reflector panel and being offset from the reflector panel by a gap; and
    an ultrasonic emitter including a driver and a horn, wherein the ultrasonic emitter is disposed through an aperture in the reflector panel with the horn extending through the loop antenna element.

2. The apparatus of claim 1, wherein a diameter of the aperture is less than one-quarter wavelength of an operating frequency of the RFID reader loop antenna element.

3. The apparatus of claim 1, wherein the aperture is located in the reflector panel near a minimum E-field area of the RFID reader loop antenna element.

4. The apparatus of claim 1, wherein the driver and horn constitute a two piece assembly, wherein the driver and horn are configured to be assembled together through the loop antenna element and the aperture.

5. The apparatus of claim 1, further comprising a plurality of co-located RFID reader loop antenna elements and ultrasonic emitter horns, wherein the reflector panels of the RFID reader loop antenna elements are electrically joined together to define a common reflector box, and wherein the reflector box defines a housing that contains circuitry for both the RFID reader loop antenna elements and ultrasonic emitters and acts as an electrical ground for the RFID reader loop antenna elements that are positioned to radiate outwardly from the reflector box.

6. The apparatus of claim 1, wherein the apparatus is configured to be mounted on a ceiling of an environment, with the ultrasonic emitter angled approximately fifteen degrees downwardly from the vertical.

7. The apparatus of claim 1, wherein a length of the horn from the reflector panel is approximately 4.5 centimeters and a distance of the loop antenna element from the reflector panel is approximately 3.175 centimeters.

8. An apparatus including a co-located Radio Frequency Identification (RFID) device and ultrasonic device, comprising:
    a plurality of RFID reader loop antenna elements each disposed away from a respective reflector panel, wherein the reflector panels are electrically joined together to define a common reflector box that defines a housing that contains circuitry for both the RFID devices and ultrasonic devices and acts as an electrical ground for the RFID reader loop antenna elements; and
    a plurality of ultrasonic emitters each including a driver and a horn, wherein each ultrasonic emitter is disposed through an associated aperture in the reflector panel with the horn extending through a co-located antenna loop element, wherein a diameter of the apertures is less than one-quarter wavelength of an operating frequency of the RFID reader loop antenna elements, and wherein the apertures are located in the reflector box near a minimum E-field area of the associated RFID reader loop antenna element.

9. A method for co-locating a Radio Frequency Identification (RFID) device and ultrasonic device, the method comprising the steps of:
  providing at least one RFID reader loop antenna element disposed away from a reflector panel, the reflector panel configured to redirect at least some radio frequency energy generated by the loop antenna element in a predetermined direction, the loop antenna element overlaying the reflector panel and being offset from the reflector panel by a gap; and
  providing at least one ultrasonic emitter including a driver and a horn, wherein each ultrasonic emitter is disposed through an aperture in the reflector panel with the horn extending through the loop antenna element.

10. The method of claim 9, wherein a diameter of the aperture is less than one-quarter wavelength of an operating frequency of the RFID reader loop antenna element.

11. The method of claim 9, wherein the aperture is located in the reflector panel near a minimum E-field area of the RFID reader loop antenna element.

12. The method of claim 9, wherein the driver and horn constitute a two piece assembly, wherein the driver and horn are configured to be assembled together through the loop antenna element and the aperture.

13. The method of claim 9, further comprising mounting the loop antenna element and emitter on a ceiling of an environment, with the ultrasonic emitter angled approximately fifteen degrees downwardly from the vertical.

14. The method of claim 9, wherein a length of the horn from the reflector panel is approximately 4.5 centimeters and a distance of the loop antenna element from the reflector panel is approximately 3.175 centimeters.

* * * * *